United States Patent [19]

Young

[11] 3,710,858
[45] Jan. 16, 1973

[54] HEAT EXCHANGER HEADER AND CORE CONSTRUCTION

[75] Inventor: Fred M. Young, Racine, Wis.
[73] Assignee: Young Radiator Company, Racine, Wis.
[22] Filed: March 24, 1971
[21] Appl. No.: 127,617

[52] U.S. Cl. ................165/178, 29/157.3, 113/118, 165/173
[51] Int. Cl. ..............................................F28f 9/04
[58] Field of Search .....165/158, 173, 175; 29/153.4, 29/157.3 R

[56] References Cited

UNITED STATES PATENTS

| 3,182,720 | 5/1965 | Brown | 165/158 |
| 3,181,606 | 5/1965 | Belanger | 165/158 |
| 2,950,092 | 8/1960 | Di Miro | 165/173 X |
| 2,296,999 | 9/1942 | Kottes | 165/175 X |
| 2,444,833 | 7/1948 | Lambert | 29/157.34 X |

Primary Examiner—Charles J. Myhre
Assistant Examiner—Theophil W. Streule, Jr.
Attorney—James E. Nilles

[57] ABSTRACT

A heat exchanger such as a radiator having a fluid header with a plurality of holes in one of its walls. Plate means, comprised of any number of plates, are parallel with and abut against the wall and the plate means also have holes aligned with the holes in the header. Tubes extend both through the plate means and through the header wall, and the tubes are soldered, brazed or otherwise secured to the header to form a leakproof joint therewith. The wall, the plate means, and the tubes are all soldered, brazed or otherwise bonded or fused together.

8 Claims, 3 Drawing Figures

PATENTED JAN 16 1973    3,710,858
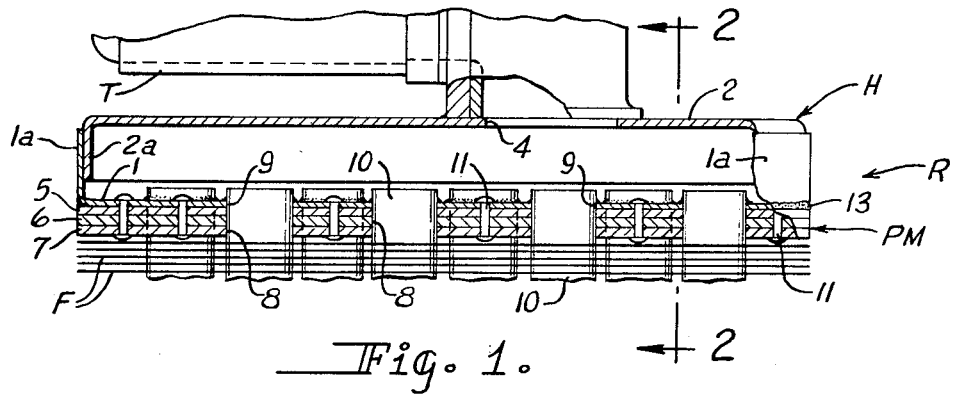
Fig. 1.
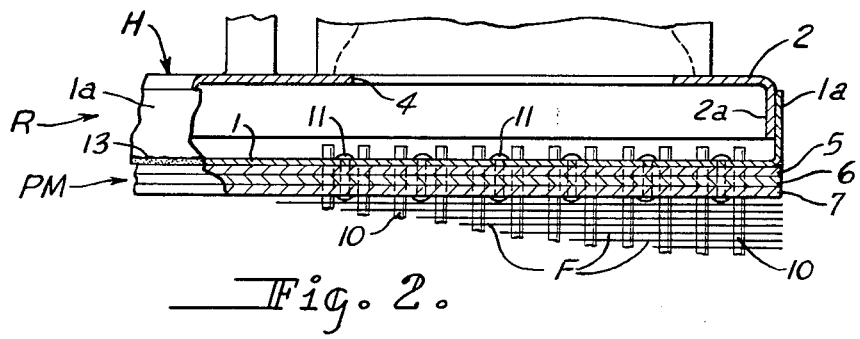
Fig. 2.
Fig. 3.
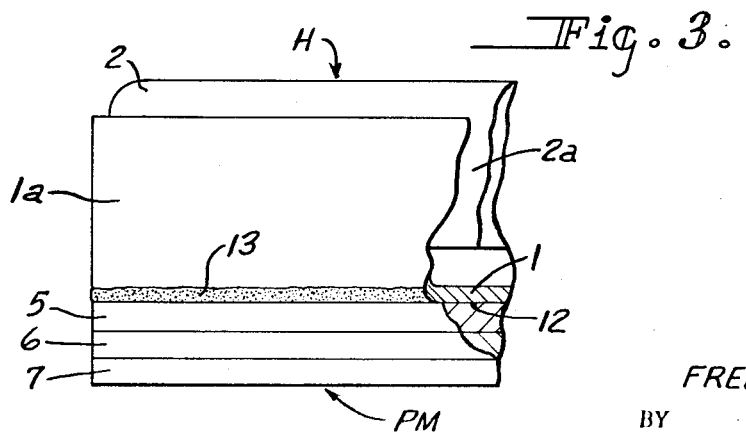
INVENTOR.
FRED M. YOUNG
BY James E. Nilles
ATTORNEY

HEAT EXCHANGER HEADER AND CORE CONSTRUCTION

BACKGROUND OF THE INVENTION

Radiators usually have a header attached to the core, the core including a series of tubes which extend into the header. The joints between the tubes and the header are then soldered, brazed or otherwise sealed, and these joints have been notorious for the formation of leaks in the radiator. The solder that is conventionally used to hold the tubes sealed to the header is usually not of sufficient strength, and also the solder becomes weak with age and use, thereby contributing to leakage of the radiator.

An example of the prior art is shown in the U.S. Pat. No. 2,488,627, issued on Nov. 22, 1949 to D.A. Hisey, which patent was assigned to an assignee common with the present application.

SUMMARY OF THE INVENTION

The present invention provides an improved radiator in which one of the header walls has plate means parallel with and abutting thereagainst. This plate means may comprise any number of plates. A plurality of precisely formed and accurate aligned holes are formed, as by punching, through the header wall and also through each of the plates, the wall and plates are then assembled with their holes in alignment. The aligned holes are then broached to form a particularly accurate, smooth and continuous walled construction, thereby preventing the formation of any crevices or spaces between the plates and in which the solder or other sealing could otherwise flow.

The tubes of the core are then inserted into the aligned and precise holes where they terminate in the header. The header wall, the plate means, and the tubes are all secured together by soldering, brazing, or other means, to result in an integrally formed header, plate means and tube construction.

The juncture, between the header wall and the abutting adjacent plate, is brazed all around the periphery of the juncture. This prevents separation of the wall and plate which would otherwise occur due to bending, prying or leverage action between the parts.

Yet another more specific aspect of the invention relates to applying the sealing means to the wall, plate means and tubes by means of dipping the assembled construction in molten solder or the like, whereby the solder saturates the unit and makes it essentially of one piece construction.

These and other objects and advantages of the present invention will appear hereinafter as this disclosure progresses, reference being had to the accompanying drawings.

BRIEF DESCRIPTION OF THE DRAWINGS

FIG. 1 is a sectional view through a portion of a radiator employing the present invention;

FIG. 2 is a sectional view taken generally along line 2—2 in FIG. 1; and

FIG. 3 is an enlarged, fragmentary view of the juncture between the header wall and the adjacent plate, which juncture is brazed all around its periphery.

DESCRIPTION OF A PREFERRED EMBODIMENT

The radiator R shown for purposes of illustrating the present invention includes an enclosed header H comprising a pair of wall members 1 and 2, each having inwardly turned edges 1a and 2a, respectively, which are soldered or otherwise secured together to form an enclosed fluid header. An opening 4 is provided in the header for the passage of fluid. A series of fluid contacting tubes 10 extend into the header for fluid communication therewith. Cooling elements, such as thin fins F are attached to the tubes in the known manner. The tubes form the prime cooling surface and the fins form the secondary cooling surface.

In accordance with the present invention, plate means PM are provided in parallel and abutting relationship with the wall 1 and this plate means may constitute any number of plates, such as the three plates 5, 6 and 7 shown. The plate means is of substantially greater thickness than the wall 1. The plate means comprises a lamination of accurately formed individual plates which reinforces the wall 1 and provides exceptional strength to the header. A plurality of holes 8 are accurately formed, by a punching operation, in the individual plates. A plurality of holes 9 are also accurately formed by punching in the header wall 1. The accurately formed and aligned holes 8 and 9 accurately receive and hold the tubes 10.

Thus the holes are formed separately in the header wall 1 and in the plates 5, 6 and 7, and then the wall and plates assembled together. The wall and plates are held together as by rivets 11 and the aligned holes are then broached, thereby forming finished holes which are not only accurate and precisely aligned, but are also of smooth walled construction, and with no crevices between the plates. This has the distinct advantage of preventing the solder or other securing means from escaping between the plates and thereby contributing to a weak or imperfect joint between the tubes and the header.

The juncture 12 between the header wall 1 and the adjacent, abutting plate 5 is brazed around its entire periphery as at 13. This brazing is in the form of a fine bead. The brazing acts to prevent separation and leakage in this juncture which otherwise occurred due to the relative twisting between the header and plates. This twisting occurs due to the leverage action of the header, and the rather heavy parts, such as the tank T, to which it is attached on the relatively fragile core. This brazing between the header and adjacent wall has also prevented separation between the remaining plates 5, 6 and 7, but brazing may also be employed between the individual plates.

The joint between the tubes and the header wall and plates may be sealed by soldering, brazing, or by other securing means. I have found it particularly advantageous to dip the assembled wall 1, plate means, and appropriate portions of the tubes in molten solder which results in a one piece construction.

The present invention provides a radiator having a header inner wall, parallel plate means abutting against the inner wall, precisely aligned holes in the wall and plate means, fluid tubes extending through the holes and in communication with the interior of the header and means sealingly securing the parts together. The radiator provided by the present invention is particularly strong and rigid in an area where it has heretofore been relatively weak and troublesome, particularly in large heat exchangers subjected to particularly rough treatment such as in road earth working equipment or the like.

I claim:

1. A radiator comprising, a header having an inner wall, plate means of substantially greater thickness than said inner wall and intimately abutting against and permanently secured to said header inner wall, sealing means comprising brazing around the periphery of the juncture between said inner wall and said plate means to prevent separation and leakage at the juncture of said plate means and said inner wall, precisely formed and aligned holes of the same diameter through said wall and said plate means, fluid tubes in said holes and through said wall and plate means and in fluid communication with the interior of said header, and securing means for securing said tubes in said holes for sealing engagement therewith.

2. A radiator as defined in claim 1 further characterized in that said plate means comprises a plurality of metal plates.

3. A radiator as set forth in claim 1 further characterized in that said securing means comprises solder in which said wall, plates and tubes are dipped.

4. A radiator as claimed in claim 2 wherein said inner wall and metal plates are rivetted together.

5. A radiator comprising, a header having an inner wall, plate means abutting against said header inner wall, said plate means being of substantially greater thickness than said inner wall, the juncture between said inner wall and said plate means being brazed around the periphery of said juncture, said plate means comprising a plurality of metal plates precisely formed and aligned holes of the same diameter through said wall and said plates, said inner wall and metal plates being rivetted together, fluid tubes in said holes and through said wall and plates and in fluid communication with the interior of said header, and securing means for securing said tubes in said holes for sealing engagement therewith.

6. A radiator as set forth in claim 5 further characterized in that said securing means comprises solder in which said wall, plates and tubes are dipped.

7. A radiator comprising, a header having an inner wall, a lamination comprising a plurality of plates secured to said header inner wall, said plates together being of greater thickness than said inner wall, said inner wall and metal plates being rigidly secured together, sealing means comprising brazing around the periphery of the juncture between said inner wall and said plates to prevent separation and leakage at the juncture of at least one of said plates and said inner wall, precisely formed and aligned holes of the same diameter through said wall and said plates, fluid tubes in said holes and through said wall and plates and in fluid communication with the interior of said header, and securing means for securing said tubes in said holes for sealing engagement therewith.

8. A radiator as set forth in claim 7 further characterized in that said securing means comprises solder in which said wall, plates and tubes are dipped.

* * * * *